US007175080B2

(12) United States Patent
Ohwa

(10) Patent No.: US 7,175,080 B2
(45) Date of Patent: Feb. 13, 2007

(54) MEMORANDUM SYSTEM, PORTABLE TERMINAL, COMPUTER PROGRAM, RECORDING MEDIUM AND MEMORANDUM INFORMATION PROVIDING METHOD

(75) Inventor: Tsunayuki Ohwa, Tokyo (JP)

(73) Assignee: Sony Corporation, Tokyo (JP)

( * ) Notice: Subject to any disclaimer, the term of this patent is extended or adjusted under 35 U.S.C. 154(b) by 102 days.

(21) Appl. No.: 11/114,857

(22) Filed: Apr. 26, 2005

(65) Prior Publication Data

US 2005/0252965 A1    Nov. 17, 2005

(30) Foreign Application Priority Data

Apr. 28, 2004  (JP)  ............... 2004-133835

(51) Int. Cl.
*G06K 15/00*    (2006.01)
(52) U.S. Cl. .................. 235/383; 235/472.02
(58) Field of Classification Search ........... 235/383, 235/462.45, 462.46, 472.01, 472.02
See application file for complete search history.

(56) References Cited

U.S. PATENT DOCUMENTS

| | | | | |
|---|---|---|---|---|
| 6,199,753 | B1 * | 3/2001 | Tracy et al. ............ | 235/375 |
| 6,202,023 | B1 * | 3/2001 | Hancock et al. .......... | 701/201 |
| 6,760,701 | B2 * | 7/2004 | Sharma et al. ............ | 704/249 |

FOREIGN PATENT DOCUMENTS

| | | |
|---|---|---|
| EP | 1219927 | 7/2002 |
| JP | 2002-063447 | 2/2002 |
| JP | 2002-259808 | 9/2002 |
| WO | WO 0125985 | 4/2001 |

OTHER PUBLICATIONS

International Business Machines Corporation: "BMP: System for Notifying an Individual Using a Mobile Phone of Purchase a Previously Enrolled Daily Necessary on a Shopping List"; Research Disclosure, Kenneth Mason Publications, Westbourne, GB, vol. 463, No. 159, Nov. 2002.

* cited by examiner

*Primary Examiner*—Daniel StCyr
(74) *Attorney, Agent, or Firm*—Finnegan, Henderson, Farabow, Garrett & Dunner, L.L.P.

(57) ABSTRACT

Memorandum information specific to a user is provided at proper timings by using a portable terminal, without accessing an external apparatus and without a necessity of secure and complicated operations. A portable terminal is equipped with: a storage unit for storing an ontological dictionary and a memorandum list; a memorandum list management unit for reading service item information listed-up in the memorandum list, collating the ontological dictionary, retrieving site location information related to site information from the site information on a site providing a service item, and writing into the memorandum list at least each service item information and the site location information related to the service item information; a current location information acquisition unit for acquiring current location information; and a notification unit for performing matching between the current location information and the site location information in the memorandum list and notifying a use of memorandum information on a service item related to the matched site location information.

15 Claims, 7 Drawing Sheets

FIG. 4A

| PRODUCT INFORMATION | PRODUCT CATEGORY INFORMATION | SHOP INFORMATION |
|---|---|---|
| EYE LOTION | MEDICINE | DRUGSTORE |
| HEADACHE MEDICINE | MEDICINE | DRUGSTORE |
| COLD MEDICINE | MEDICINE | DRUGSTORE |
| CD OF ○○ | C D | CD SHOP |
| MOVIE △△ | DVD | CD SHOP |
| BREAD | FOOD | SUPERMARKET |
| MILK | FOOD | SUPERMARKET |
| SOAP | DAILY GOODS | SUPERMARKET |
| ⋮ | ⋮ | ⋮ |

FIG. 4B

| SHOP INFORMATION | SHOP LOCATION INFORMATION |
|---|---|
| DRUGSTORE | SHIBUYA KU ○○ |
| DRUGSTORE | SHINJUKU KU △△ |
| ⋮ | ⋮ |
| CD SHOP | SHIBUYA KU × × |
| CD SHOP | SHINAGAWA KU □□ |
| ⋮ | ⋮ |
| SUPERMARKET | SHINAGAWA KU ◇◇ |
| ⋮ | ⋮ |

| NO. | BUY INTEND PRODUCT INFORMATION | SHOP INFORMATION | SHOP LOCATION INFORMATION |
|---|---|---|---|
| 1 | EYE LOTION | DRUGSTORE | SHIBUYA KU ○○, SHINJUKU KU △△ |
| 2 | MOVIE △△ | CD SHOP | SHIBUYA KU ××, SHINAGAWA KU □□ |
| 3 | MILK | SUPERMARKET | SHINAGAWA KU ◇◇ |
| 4 | SOAP | SUPERMARKET | SHINAGAWA KU ◇◇ |
| ⋮ | ⋮ | ⋮ | ⋮ |

ATTENTION !

THERE IS SHOP NEARBY WHERE YOU CAN BUY YOUR DESIRED PRODUCT ITEM

PRODUCT : EYE LOTION
SHOP : DRUGSTORE
ADDRESS : SHIBUYA KU ○○

DISPLAY MAP

ATTENTION !

YOU ARE IN FRONT OF DRUGSTORE A.
DO YOU WANT TO BUY AN EYE LOTION ?

YES

NO

MEMORANDUM SYSTEM, PORTABLE TERMINAL, COMPUTER PROGRAM, RECORDING MEDIUM AND MEMORANDUM INFORMATION PROVIDING METHOD

CROSS REFERENCE TO RELATED APPLICATIONS

The present invention contains subject matter related to Japanese Priority Document JP2004-133835, filed to the Japanese Patent Office on Apr. 28, 2004, the contents of which being incorporated herein by reference.

BACKGROUND OF THE INVENTION

1. Field of the Invention

The present invention relates to a memorandum system, a portable terminal, a computer program, a recording medium and a memorandum information providing method.

2. Description of Related Art

In order not to forget memorandum information regarding desired products, desired services and the like, many people memorize it or leave it as a memorandum. Even if the memorandum is in written form, necessary memorandum information cannot be used effectively in many cases, because the existence or contents of the memorandum are forgotten or the memorandum is lost. For example, although there is a product item to be bought, if it is not necessary at this instance, the person writes a shopping memorandum and when the person goes out of the house for another work, the product item is bought on this occasion. Even in this case, although the person goes near a shop which sells the desired product item, the person does not know and passes by the shop, or the person forgets the product item.

SUMMARY OF THE INVENTION

In the case described above, it is convenient if the desired product item information, location information (e.g., information on an address, a map and the like) of a shop which sells the product item, and other information is automatically notified when a person goes near the shop. Namely, necessary information can be used effectively if there is a means for automatically notifying necessary memorandum information at good timings when necessary.

Many recent portable terminals have a memorandum function and can notify users of necessary information at a scheduled time after alarming. However, no portable terminal notifies necessary location information such as an address and a latitude/longitude.

In this circumstance, an invention relating to a shopping guide information providing apparatus has been made (for example, refer to Japanese Patent Application Publication No. 2002-175465). According to the disclosed apparatus, a user of a portable terminal registers in advance product item information on a desired product item, in a shopping management apparatus, and the apparatus acquires location information on the user portable terminal, and when the user comes near the shop which sells the product item, this effect is notified to the user portable terminal to guide the user to the shop.

However, according to the invention disclosed in Japanese Patent Application Publication No. 2002-175465, in order to receive a guidance notification from the shopping management apparatus, the user portable terminal is required to access the shopping management apparatus via a network such as the Internet. Therefore, personal information is required to be transmitted and received over the network, the personal information containing, for example, desired product item information, a user current location, a telephone number if the portable terminal is a telephone, and the like. This poses an unfavorable issue of security such as a possibility of outflow of personal information.

According to the invention disclosed in Japanese Patent Application Publication No. 2002-175465, a user is required to register desired product item information and the like in the shopping management apparatus. For the registration, it is necessary for the user to access the shopping management apparatus via a network and input an ID, a password, a telephone number and the like. This may bring about an issue of more complicated operations required as compared to the case that these processes can be executed only on the portable terminal side.

In order to realize more effectively the shopping guide function of the invention disclosed in Japanese Patent Application Publication No. 2002-175465, it is desired that the shopping management apparatus constantly grasps the current location of each user. To this end, it is desired that a user portable terminal is constantly connected to the network. Therefore, in addition to the above-described security, if a number of portable terminals access the shopping management apparatus as a server, a load on the server side becomes large, resulting in a possibility of a delay of a guidance notification. Each user has to bear charges for utilization of the network connection and the like.

The present invention has been conceived in order to alleviate these issues and provides a novel and improved memorandum system, portable terminal, computer program, recording medium and memorandum information providing method, capable of providing user-specific memorandum information at appropriate timings without accessing an external apparatus and without a necessity of secure and complicated operations.

In order to alleviate the above-described issues, according to a first preferred embodiment of the present invention, there is provided a memorandum system having functions of a portable phone as a memorandum including an ontological dictionary management server, a portable terminal and a communication network for interconnecting the ontological dictionary management server and the portable terminal through bi-directional communications.

The ontological dictionary management server manages an ontological dictionary itself and updates information on the ontological dictionary. The main role of the ontological dictionary is to provide the portable terminal with update information when information registered in the ontological dictionary is updated. The role is not limited only to supplying the update information.

In general, an ontological dictionary systematically describes various relations between terms such as synonyms, upper and lower concepts, antonyms, causalities, and methods. The ontological dictionary of the present invention systematically describes the relations between, for example, product item information (e.g., eye lotion), information on a shop selling the product item (e.g., a drugstore) and location information on the shop (e.g., address and the like of the drugstore).

The ontological dictionary management server is constituted of an ontological dictionary management unit for managing the ontological dictionary and a communication unit for providing the ontological dictionary in response to a request from the portable terminal.

The ontological dictionary management unit has a function of managing the ontological dictionary systematically describing the relations between a service item (e.g., eye lotion), information on a site (e.g., information on a shop such as a drugstore) for providing the service item and information on a site location (e.g., information on a shop location information such as a drugstore address).

The communication unit of the ontological dictionary management server receives from the portable terminal a request for supplying the ontological dictionary and/or its update information, and in response to the request, transmits the ontological dictionary and/or its update information.

The portable terminal is constituted of a communication unit for receiving the ontological dictionary from the ontological dictionary management server, a storage unit for storing a memorandum list and the ontological dictionary, a memorandum list management unit for reading/writing information from/to the memorandum list, a current location information acquisition unit for acquiring current location information on the portable terminal, and a notification unit for notifying a user of predetermined memorandum information.

The communication unit of the portable terminal requests the ontological dictionary management server for the ontological dictionary and receives the ontological dictionary from the ontological dictionary management server.

The storage unit of the portable terminal stores the ontological dictionary and the memorandum list containing service item information listed up specifically for each user, e.g., desired product information (e.g., eye lotion).

The storage unit may include both a non-volatile memory such as a ROM (Read Only Memory) and a volatile memory such as a RAM (Random Access Memory). In this case, the memorandum list is preferably stored in the volatile memory so that information written or to be written in the memorandum list can be added, deleted, changed, etc., freely. Therefore, a user can freely add information which becomes necessary at a later time, delete data which becomes unnecessary due to object achievement, change information which becomes necessary to be changed due to circumstance change, and etc., so that the user can be supplied with more useful memorandum information.

The memorandum list management unit has a function of reading service item information (e.g., desired product information) listed up in the memorandum list (e.g., shopping list), collating the ontological dictionary, retrieves site location information (e.g., shop location information) from information on a site (e.g., shop) providing a service item (e.g., a desired product), and writing at least the service item information and the site location information related to the service item information, in relation to each other, in the memorandum list.

A method of acquiring a current location of the portable terminal (user) to be executed by the current location information acquisition unit may be a method using a positioning information system such as GPS (Global Positioning System), hot spots, and PHS (Personal Handyphone System), although not limiting to this method.

The notification unit has a function of performing matching between the current location information the site location information on the memorandum list, and notifying the user of memorandum information on the service item related to the matched site location information. The memorandum information means information such as a desired product item (eye lotion and the like), a shop (drugstore and the like) selling the desired product and the location of the shop (address such as Shinjuku Ku ○○ or its map). All of these three pieces of the memorandum information may not be notified to the user. For example, only the desired product information or the desired product information and shop location information may be notified.

In the present invention, "matching" and "matched" are not intended to mean the current location information is exactly coincident with the site location information (e.g., the latitude/longitude is exactly coincident), but are intended to mean that both locations match within a certain allowable range.

In order to alleviate the above-described issues, according to a second preferred embodiment of the present invention, there is provided a portable terminal including: a storage unit for storing a memorandum list containing service item information listed up specifically for each user and an ontological dictionary systematically describing relations between a service item, information on a site providing the service item and site location information related to the site information; a memorandum list management unit for reading the service item information listed up in the memorandum list, collating the ontological dictionary, retrieving the site location information related to the cite information from the information on the site providing the service item, and writing in the memorandum list at least the service item information and the site location information related to the service item information in relation to each other; a current location information acquisition unit for acquiring current location information; and a notification unit for performing matching between the current location information and the site location information in the memorandum list, and notifying a user of memorandum information on the service item related to matched site location information.

For example, the memorandum list is a shopping list, the service item information is product information (e.g., eye lotion), and the site information is information on a shop (e.g., drug store) selling the product and the site location information is location information (e.g., the address of the drugstore) on the shop. The memorandum information is, for example, information on at least a product a user desires to buy.

As described above, the ontological dictionary is a dictionary systematically describing the relations between, for example, product information (e.g., eye lotion), information on a shop (e.g., drugstore) selling the product and location information (e.g., the address of the drugstore and the like) on the shop. The ontological dictionary may be constituted of following two databases. Namely, the ontological dictionary may be constituted of a first database systematically describing the relation between the product information and the shop information and a second database systematically describing the relation between the shop information and the shop location information. By constituting the ontological dictionary by two separate databases, the data amount can be reduced more than the case in which it is constituted of one database, so that the memory use amount of the storage unit can be suppressed.

The portable terminal may further include a communication unit for receiving update information on the ontological dictionary from the ontological dictionary management server and an update unit for updating the ontological dictionary in the storage unit.

In order to alleviate the above-described issues, according to a third preferred embodiment of the present invention, there is provided a computer program for having a function of a portable terminal, which is equipped with a storage unit for storing a memorandum list containing service item information listed up specifically for each user and an ontological dictionary systematically describing relations between a service item, information on a site providing the service item and site location information related to the site information, as: a memorandum list management unit for reading the service item information listed up in the memorandum list, collating the ontological dictionary, retrieving the site location information related to the cite information from the information on the site providing the service item, and writing in the memorandum list at least the service item information and the site location information related to the service item information in relation to each other; a current location information acquisition unit for acquiring current location information; and a notification unit for performing matching between the current location information and the site location information in the memorandum list, and notifying a user of memorandum information on the service item related to matched site location information.

In the computer program, the service item information may be product information, the memorandum list may be a shopping list, the site information may be shop information, the site location information may be shop location information, and the memorandum information may be information on at least a product a user desires to buy.

In the computer program, the ontological dictionary may be constituted of a first database systematically describing the relation between the product information and the shop information and a second database systematically describing the relation between the shop information and the shop location information.

The computer program may be a computer program further having a function of a communication unit for receiving update information on the ontological dictionary from the storage unit and the ontological dictionary management server, as an update unit for updating the ontological dictionary in the storage unit.

In order to alleviate the above-described issues, according to a fourth preferred embodiment of the present invention, there is provided a computer readable recording medium storing a computer program having a function of a portable terminal, which is equipped with a storage unit for storing a memorandum list containing service item information listed up specifically for each user and an ontological dictionary systematically describing relations between a service item, information on a site providing the service item and site location information related to the site information, as: a memorandum list management unit for reading the service item information listed up in the memorandum list, collating the ontological dictionary, retrieving the site location information related to the cite information from the information on the site providing the service item, and writing in the memorandum list at least the service item information and the site location information related to the service item information in relation to each other; a current location information acquisition unit for acquiring current location information; and a notification unit for performing matching between the current location information and the site location information in the memorandum list, and notifying a user of memorandum information on the service item related to matched site location information.

In order to alleviate the above-described issues, according to a fifth preferred embodiment of the present invention, there is provided a memorandum information providing method for providing memorandum information to a portable terminal which is equipped with a storage unit for storing a memorandum list containing service item information listed up specifically for each user and an ontological dictionary systematically describing relations between a service item, information on a site providing the service item and site location information related to the site information, the memorandum information providing method including: a memorandum list creating unit for reading the service item information listed up in the memorandum list, collating the ontological dictionary, retrieving the site location information related to the cite information from the information on the site providing the service item, and writing in the memorandum list at least the service item information and the site location information related to the service item information in relation to each other; a current location information acquisition step for acquiring current location information; and a notification step for performing matching between the current location information and the site location information in the memorandum list, and notifying a user of memorandum information on the service item related to matched site location information.

The memorandum information providing method may further include a reception step for receiving update information on the ontological dictionary from the ontological dictionary management server and an update step for updating the ontological dictionary in the storage unit.

According to the preferred embodiments of the present invention, it may be possible to provide user-specific memorandum information at appropriate timings without accessing an external apparatus and without a necessity of secure and complicated operations.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 4A is an illustrating diagram showing the outline structure of a first database if the ontological dictionary 252 is constituted of two databases, according to a modification of the preferred embodiment of the present invention.

FIG. 4B is an illustrating diagram showing the outline structure of a second database if the ontological dictionary 252 is constituted of two databases, according to the modification of the preferred embodiment of the present invention.

DESCRIPTION OF THE PREFERRED EMBODIMENTS

With reference to the accompanying drawings, preferred embodiments of the present invention will be described in detail. In the specification and drawings, constituent elements having substantially the same functional structure are represented by identical symbols and the duplicated description thereof is omitted.

<Memorandum System 100>

<Configuration of Memorandum System 100>

Figure 1:
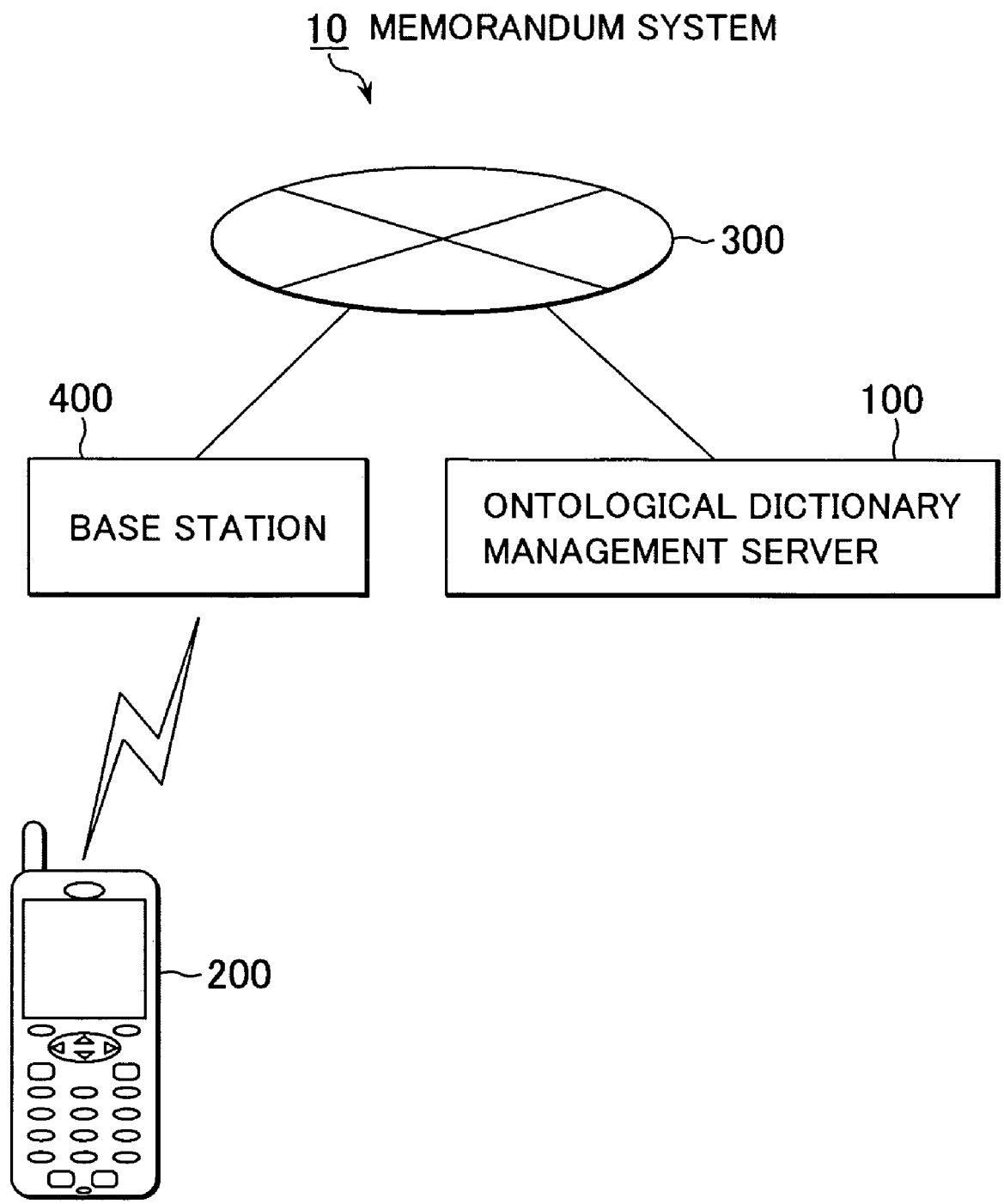
FIG. 1 is a block diagram showing the outline configuration of a memorandum system 10 according to a preferred embodiment of the present invention.

With reference to FIG. 1, description will be made on the configuration of a memorandum system 10 of a preferred embodiment of the present invention. FIG. 1 is a block diagram showing the outline configuration of the memorandum system 10.

The memorandum system 10 of the preferred embodiment of the present invention is a system for making a portable terminal function as a memorandum, and is constituted of an ontological dictionary management server 100 and a portable terminal 200 interconnected by a communication network 300 such as the Internet through bi-directional communications. Although the portable terminal 200 may be connected directly to the communication network 300, it is usually connected to the communication network 300 via a base station 400.

(Structure of Ontological Dictionary Management Server 100)

The ontological dictionary management server 100 is one constituent element of the memorandum system 10 and is a server for managing an ontological dictionary itself and update information on the ontological dictionary. The main role of the ontological dictionary server 100 is to supply update information to the portable terminal 200 when information registered in the ontological dictionary is updated, although the main role is not limited only to the supply of update information.

In general, an ontological dictionary systematically describes various relations between terms such as synonyms, upper and lower concepts, antonyms, causalities, and methods. The ontological dictionary of the preferred embodiment of the present invention systematically describes the relations between, for example, product item information (e.g., eye lotion), information on a shop selling the product item (e.g., a drugstore) and location information on the shop (e.g., address and the like of the drugstore).

The ontological dictionary management server 100 is constituted of an ontological dictionary management unit (not shown) for managing the ontological dictionary and a communication unit (not shown) for providing the ontological dictionary in response to a request from the portable terminal.

The ontological dictionary management unit manages the ontological dictionary as described above, and updates the ontological dictionary mainly when information registered in the ontological dictionary is updated. For example, the ontological dictionary is updated when the shop location information (address and the like) is changed because of transfer of the shop or when product information (product items for sales) is added or changed because of new product developments.

In addition to updating the ontological dictionary, the ontological dictionary management unit can store a deleted ontological dictionary or a newly formed ontological dictionary in a storage unit (not shown) of the ontological dictionary management server 100.

The ontological dictionary management unit can further edit the ontological dictionary. More specifically, the shop location information can be limited to a particular district (e.g., only Shinagawa Ku), the shop information can be limited to a particular shop (e.g., ○○ drugstore), and the product information can be limited to a particular product item (e.g., a product item whose number of productions is limited). A user can therefore be supplied with the ontological dictionary matching user preferences and can receive necessary memorandum efficiently.

The communication unit receives from the portable terminal 200 a request for supplying the ontological dictionary and/or its update information, and in response to the request, transmits the ontological dictionary and/or its update information, so that the ontological dictionary management server 100 can provide the portable terminal 200 with the ontological dictionary and/or its update information. In this case, only the update information may be provided or the whole updated ontological dictionary may be provided. A user may therefore receive the ontological dictionary in a desired form matching the memory capacity of the portable terminal 200.

Instead of supplying the ontological dictionary and its update information, the ontological dictionary management server 100 can allow the portable terminal 200 only to use the ontological dictionary. When the ontological dictionary management server 100 allows the portable terminal 200 to use the ontological dictionary, the ontological dictionary management server 100 may perform authentication, for example, authentication by a user ID and password, authentication by an authentication system such as a signature creating system, authentication by a certificate management system, and other authentications. The user can use the memorandum system 10 of the preferred embodiment of the present invention even if the data amount of the ontological dictionary exceeds the memory capacity of the storage unit of the portable terminal 200.

(Structure of Portable Terminal 200)

Figure 2:
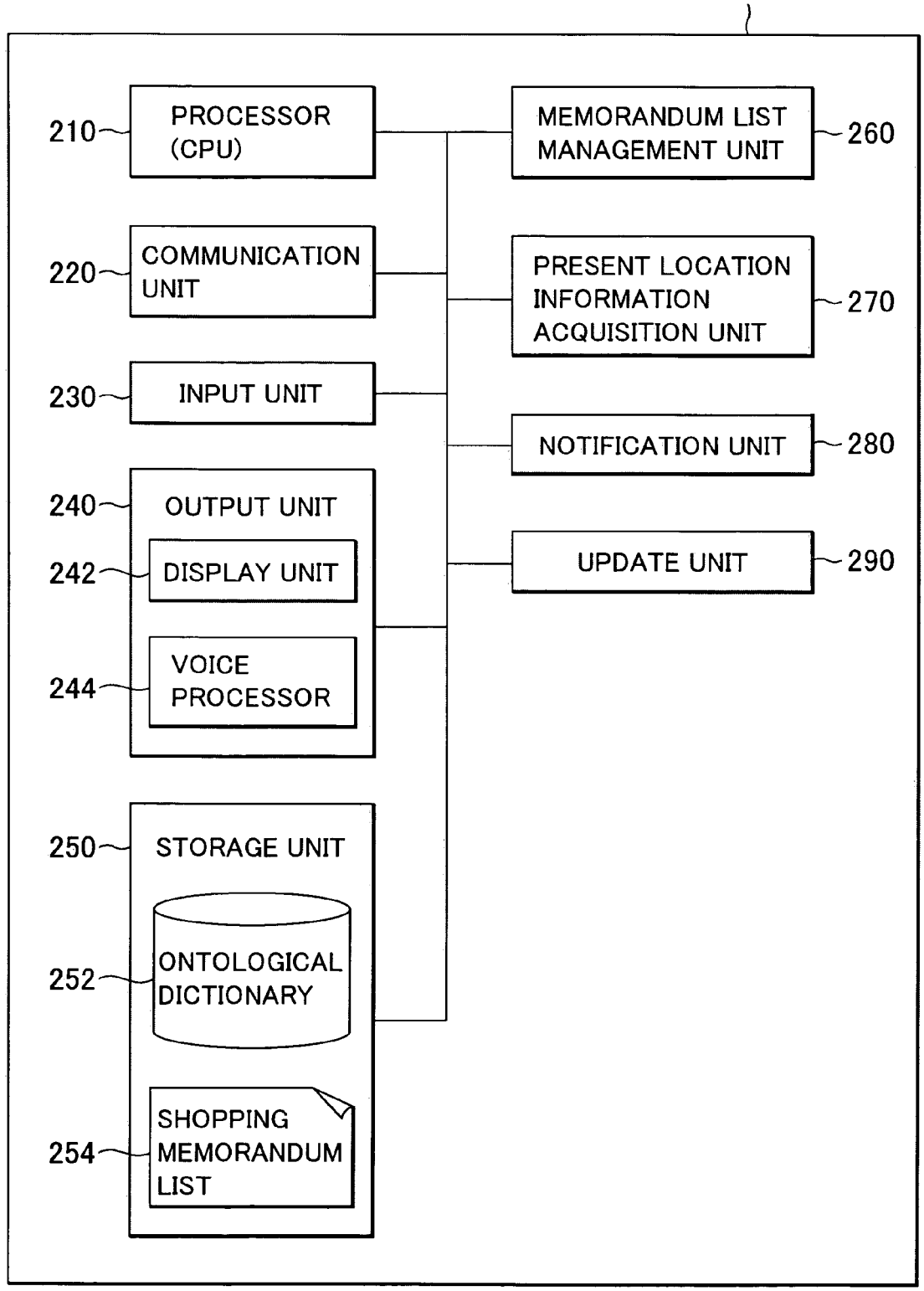
FIG. 2 is a block diagram showing the outline structure of a portable terminal 200 according to the preferred embodiment of the present invention.

Next, with reference to FIG. 2, description will be made on the structure of the portable terminal 200 of the preferred embodiment of the present invention. FIG. 2 is a block diagram showing the outline structure of the portable terminal 200.

The portable terminal 200 is one constituent element of the memorandum system 10 and has a memorandum function. The portable terminal 200 can receive memorandum information at proper timings by using the ontological dictionary possessed by the portable terminal or by the ontological dictionary management server 100. In the following description, a shopping memorandum system will be used by way of example which is one preferred embodiment of the memorandum system of the present invention.

As shown in FIG. 2, the portable terminal 200 is constituted by a processor (CPU) 210, a communication unit 220, an input unit 230, an output unit 240, a storage unit 250, a memorandum list management unit 260, a current location information acquisition unit 270, a notification unit 280, an update unit 290 and the like.

The processor 210 is specifically a CPU (Central Processing Unit), performs the control (instruction fetch, decode, instruction and the like) of the portable terminal 200 and computations.

The communication unit 220 requests the ontological dictionary management server 100 for the ontological dictionary and receives the ontological dictionary from the ontological dictionary management server 100. In order to configure the memorandum system 10 of the preferred embodiment of the present invention, although the communication unit 220 is sufficient only if it executes communications with at least the ontological dictionary management server 100, it may execute communications with other portable terminals (such as speech and transmission/reception of emails).

The input unit 230 converts analog information such as numerals and characters entered by a user into digital information, and transfers it to the processor 210. In this preferred embodiment, the input unit 230 is operation keys of the portable terminal.

The output unit 240 converts digital information processed by the processor 210 into analog information and outputs it to an external. The output unit 240 includes a display unit 242 and a voice processing unit 244. The display unit 242 is, for example, an LCD (Liquid Crystal Display) display in the preferred embodiment of the present invention. The voice processing unit 244 exchanges analog voices and digital information, and is, for example, a microphone and a speaker in the preferred embodiment of the present invention.

The storage unit 250 is an apparatus that stores computer programs and data. According to the present preferred embodiment of the present invention, the storage unit 250 stores at least the ontological dictionary 252 and the shopping memorandum 254, however not being limited to those contents.

The storage unit 250 may include both a non-volatile memory such as a ROM (Read Only Memory) and a volatile memory such as a RAM (Random Access Memory). In this case, the shopping list 254 is preferably stored in the volatile memory so that information written or to be written in the shopping list 254 can be added, deleted, changed, etc., freely. Therefore, a user can freely add information which becomes necessary at a later time, delete data which becomes unnecessary due to object achievement, change information which becomes necessary to be changed due to circumstance change, and etc., so that the user can be supplied with more useful memorandum information.

Figure 3:
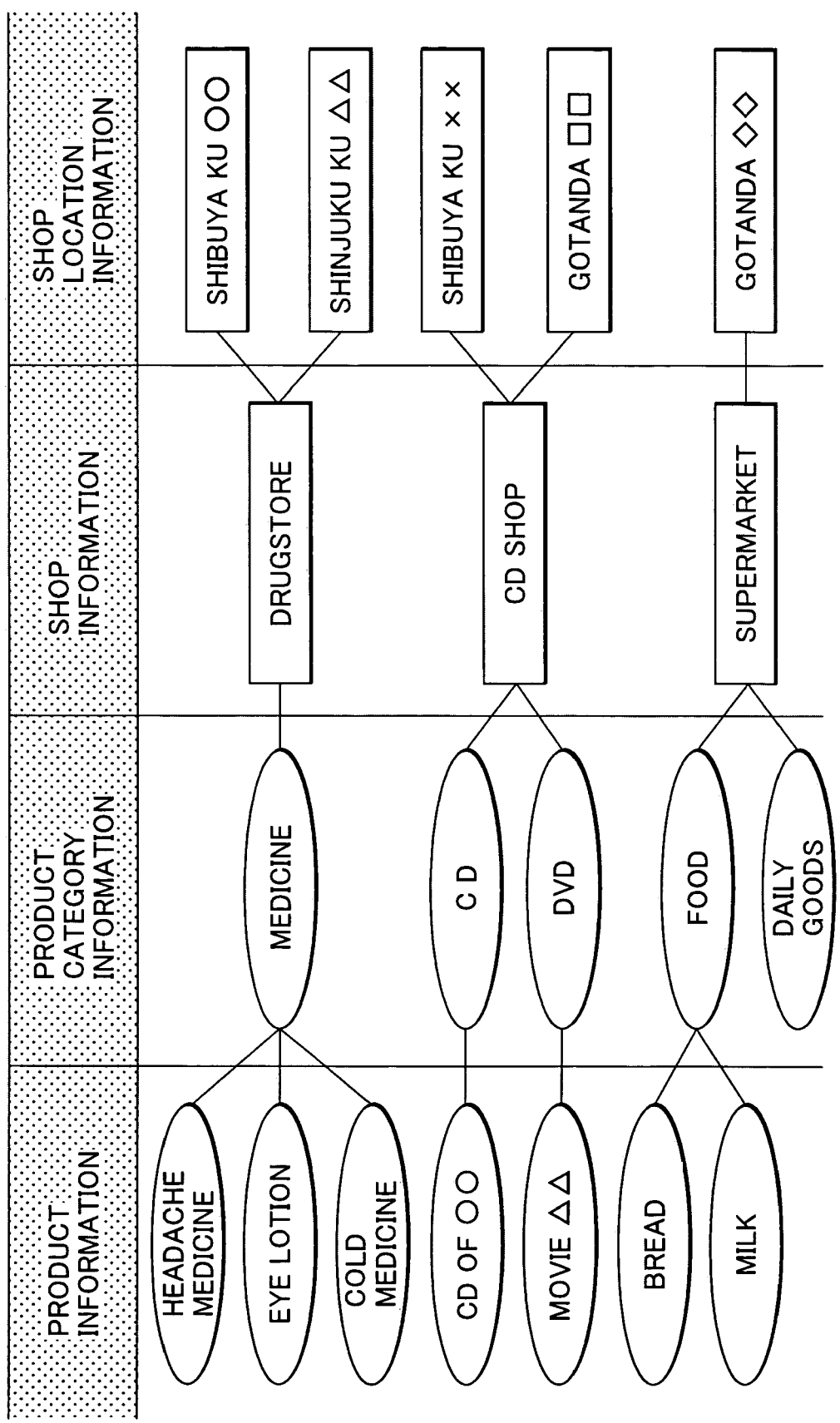
FIG. 3 is an illustrative diagram showing the outline structure of an ontological dictionary 252 according to the preferred embodiment of the present invention.

The structure of the ontological dictionary 252 will be described specifically with reference to FIG. 3 and FIGS. 4A and 4B, and the structure of the shopping list 254 will be described specifically with reference to FIG. 5. FIG. 3 is an illustrative diagram showing the outline structure of the ontological dictionary 252.

FIG. 4A is an illustrative diagram showing the outline structure of a first database when the ontological dictionary 252 is constituted of two databases as a modification of the preferred embodiment of the present invention. FIG. 4B is an illustrative diagram showing a second database of the modification. FIG. 5 is an illustrative diagram showing the outline structure of the shopping list 254.

In general, an ontological dictionary is a dictionary (database) systematically describing various relations between terms such as similar words, general and specific concepts, antonyms, causalities, and methods so as to make a computer establish relations. The ontological dictionary 252 of the preferred embodiment of the present invention is, as shown in FIG. 3, a dictionary systematically describing the relations between arbitrary product information (e.g., eye lotion, CD of ○○, bread, etc.), product categoryinformation (e.g., medicine, CD, food, etc.), shop information (e.g., drugstore, CD shop, supermarket, etc.) and shop location information (e.g., Shibuya Ku ○○, Shinjuku Ku ΔΔ, Shinagawa Ku □□, etc.), so as to make a computer understand the relations.

By using the ontological dictionary 252, a computer may establish the relations between terms, such as that headache medicine, eye lotion and cold medicine are contained in a medicine category, that medicine is sold at a drugstore, and that the drugstore is at a location (e.g., address) of Shibuya Ku ○○, or Shinjuku Ku ΔΔ. Next, the computer synthesizes the relations between these terms so that it can automatically understand that eye lotion is sold at the drugstore in Shibuya Ku ○○, for example. Also, if a user wants to purchase eye lotion, as the user enters "eye lotion" from the input unit 220, the processor 210 can automatically recognize that "eye lotion is sold in Shibuya Ku ○○ and Shinjuku Ku ΔΔ". Therefore, when a user retrieves the location of the shop selling eye lotion, it is not necessary to stepwise retrieve the product category (medicine) containing eye lotion, the shop (drugstore) selling the medicine, and the location of the drugstore (Shibuya Ku ○○ and Shinjuku Ku ΔΔ"), but the location of the shop can be retrieved directly by entering "eye lotion" so that retrieval can be performed easily and efficiently.

By using the ontological dictionary, the computer is made understood that "eye lotion" and "dropping lotion" are the same product. It is therefore possible to avoid the situation that even if a user enters "eye lotion", a proper retrieval result cannot be obtained because the storage unit 250 stores only "dropping lotion"

The ontological dictionary 252 may be constituted of two databases, the first database shown in FIG. 4A and the second database shown in FIG. 4B. The first database is a database systematically describing the relations between arbitrary product information (e.g., eye lotion, bread, etc.), product category information corresponding to the product information (e.g., medicine, food, etc.) and information on a shop (e.g., drugstore, supermarket, etc.) corresponding to the product category (the shop selling product items contained in the product category). The second database is a database systematically describing the relations between shop information (e.g., drugstore, supermarket, etc.) and shop location information representative of the location of the shop (e.g., Shibuya Ku ○○, Shinagawa Ku ◇◇, etc.). In FIG. 4A, eye lotion, headache medicine and cold medicine are used as the examples of medicine, and bread and milk are used as the examples of food. It is obvious that the examples are not limited only to these.

In FIG. 4A, although specific product names are used as the product information, these product names are encoded to be processed by the processor 210. The shop information may be the type of shops such as "drugstore" or the name of the shop such as "drugstore A". In FIG. 4B, an address is used as the shop location information, and although the address is not limited to an urban and rural prefecture base, a city and district base, and a house number base, it is preferable that the address indicates a narrow range such as a house number in order to make the preferred embodiment of the present invention effective. The shop location information may be expressed by a latitude/longitude instead of the address. It is obvious that the address and latitude/longitude are also encoded to be processed by the processor 210.

Since the ontological dictionary 252 is constituted of two databases, the data amount of each database can be made smaller than the case in which ontological dictionary is constituted of one database, so that the memory use amount of the storage unit 250 can be suppressed.

In this preferred embodiment of the present invention, although the ontological dictionary 252 contains product category information, it is not necessarily required to contain the product category information.

Figures 5, 6:
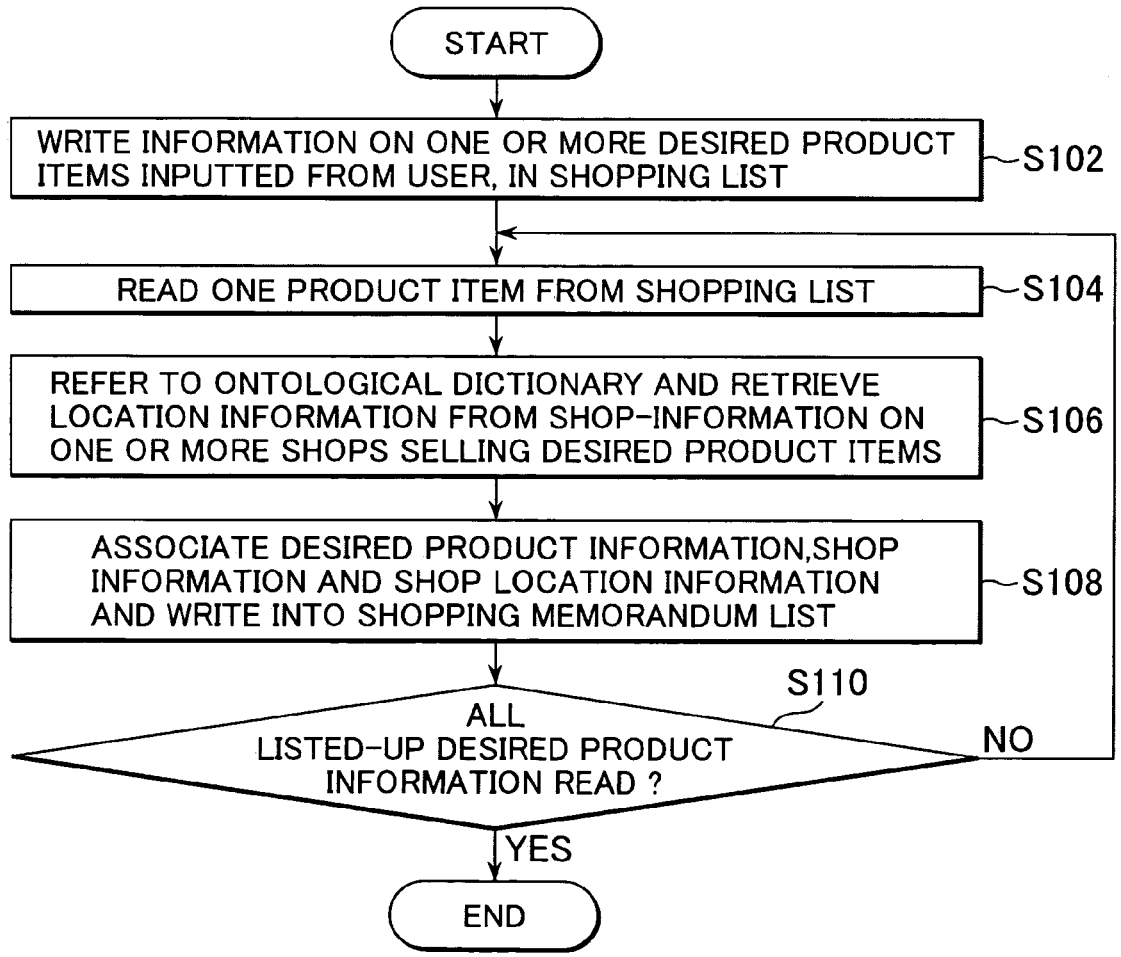
FIG. 5 is an illustrative diagram showing the outline structure of a shopping list 254 according to the preferred embodiment of the present invention.
FIG. 6 is a flow chart illustrating the outline of a process of forming the shopping list 254 in a memorandum information providing method according to the preferred embodiment of the present invention.

As shown in FIG. 5, the shopping list 254 contains desired product item information (e.g., eye lotion, milk, etc.) entered by a user, shop information on shops selling the desired product items (e.g., drugstore, supermarket, etc.), and shop location information representative of the location of the shop (e.g., Shibuya Ku ○○ and Shinjuku Ku △△").

It is preferable that the desired product information contained in the shopping list 254 can be added or deleted freely by the user. When the user desires to buy a new product item (i.e., before forgetting it), the user can add the desired product information. After the product item is bought, the user deletes the desired product information on the item from the shopping list 254 so that the user will not obtain the memorandum information on the product item. It is therefore possible to avoid the situation that a same item as already purchased is bought twice.

Next, description of the portable terminal 200 will proceed with reference to FIG. 2.

The memorandum list management unit 260 performs creation, change and the like of the shopping list. More specifically, the memorandum list management unit 260 writes the desired product information (e.g., eye lotion, milk, etc.) entered by a user in the shopping list 254 (list-up). Next, the memorandum list management unit 260 reads the list-up desired product information, and refers to the ontological dictionary 252 to retrieve the shop location information (Shinjuku Ku ○○, Shinagawa Ku ◇◇, etc.) in accordance with the shop information (drugstore, supermarket, etc.) of the shop selling the desired product item. The memorandum list management unit 260 writes in the shopping list 254 at least the desired product information and the shop location information on the shop selling the desired product item, related to each other. In this case, not only the shop location information but also the shop information may be stored in relation to the shop location information in the shopping list 254. The shopping list 254 as shown in FIG. 5 is then created in the manner as described above.

The current location information acquisition unit 270 acquires the current location information (address, latitude/longitude, etc.) in order to grasp the current location of the personal terminal (i.e., the current location of the user). More specifically, the current location of the portable terminal 200 is grasped by using a positioning information system such as GPS (Global Positioning System), hot spots, and PHS (Personal Handyphone System). GPS may be built in the portable terminal or in an external apparatus.

The notification unit 280 performs matching between the current location information acquired by the current location information acquisition unit 270 and the shop location information listed up in the shopping list 254, and notifies the user of the memorandum information on the desired product item related to the matched shop location information.

Here, "memorandum information" means information such as information on desired product item (eye lotion and the like), the shop (drugstore and the like) selling the product item, and the location of the shop (address such as Shinjuku Ku ○○ or its map). All of these three pieces of the memorandum information may not be notified to the user. For example, only the desired product information or the desired product information and shop location information may be notified.

In the preferred embodiment of the present invention, "matching" and "matched" are not intended to mean the current location information is exactly coincident with the shop location information (e.g., the latitude/longitude is exactly coincident), but are intended to mean that both match within a certain allowable range. Namely, in this preferred embodiment of the present invention, "matched" is intended to mean the shop selling the desired product item is located at a predetermined distance (e.g., within a radius of 100 m) from the current location.

The update unit 290 updates the ontological dictionary 252 stored in the storage unit 250 when update information on the ontological dictionary 252 is supplied from the ontological dictionary management server 100 and the like.

Update information on the ontological dictionary 252 is not limited only to that stored in the ontological dictionary management server 100, but also it may be update information stored in a terminal not connected to a communication line capable of bi-directional communications such as the Internet, or update information stored in a computer readable recording medium such as an SD memory card, a CD-ROM, and a floppy disk (a registered trademark).

Specific examples of the portable terminal 200 of the preferred embodiment of the present invention described above may be a portable phone, a PHS (Personal Handyphone System), a PDA (Personal Digital Assistant), a car navigation system and the like, although not limited only thereto.

<Memorandum Information Providing Method>

Next, with reference to FIGS. 6 to 10, description will be made on the memorandum information providing method of the preferred embodiment of the present invention. In the following, description will be made by dividing the method into the process of creating the shopping list 254 and the process of notifying a user of memorandum information after the list is created.

(Creating Shopping Memorandum List 254)

First, with reference to FIG. 6, description will be made on the processes up to the process of creating the shopping list 254. FIG. 6 is a flow chart illustrating the outline of the processes up to the process of creating the shopping list 254 in the memorandum information providing method of the preferred embodiment of the present invention.

First, a user enters one or more desired product items (e.g., eye lotion, bread and the like). The input unit 230 converts one or more desired product items entered by the user into digital desired product information. The memorandum list management unit 260 writes the desired product items into the shopping list 254 (S102: list-up). At this time data is written only in the field of the desired product information on the shopping list 254, and the fields of the shop information and shop location information are still empty.

Next, the memorandum list management unit 260 reads the desired product information on one desired product item from the desired product information listed up in the shopping list 254 (S104). In this case, the desired product information on all items may be read at a time.

Next, the memorandum list management unit 260 refers to the ontological dictionary 252 and retrieves shop location information on one or more shops (e.g., addresses of drug stores such as Shibuya Ku ○○ and Shinjuku Ku ΔΔ) in accordance with the shop information (e.g., drugstore) of the shop selling the product item corresponding to the read desired product information (S106). In this case, since the ontological dictionary 252 registers the shop information and a plurality of pieces of the shop location information in relation to each other, the memorandum list management unit 260 can retrieve the shop location information on one or more shops related to the shop information at a time without retrieving one piece after another of the shop location information, thereby realizing efficient retrieval.

The memorandum list management unit 260 may be provided with a particular retrieval function of limiting only to particular shop information and shop location information, such as retrieval of only drugstore A because the drugstore A sales at conscientious prices (retrieval excluding drugstores B, C . . . ) and retrieval limiting only to shops in Shibuya Ku. By providing this function to the memorandum list management unit 260, for example, the memorandum list management unit 260 is dispensed with retrieval of location information on the drugstore B to which a user never goes because of a high price and with retrieval of location information on a drugstore in Hokkaido a user seldom goes because of a remote district. It is therefore possible to realize efficient and speedy retrieval suitable for user preferences.

The memorandum list management unit 260 writes the retrieved shop location information (Shibuya Ku ○○, Shinjuku Ku ΔΔ, etc.) and shop information (drugstore, etc.) corresponding to the location information in relation to each other, and the read desired product information (eye lotion) into the shopping list 254 (S108). In this example, although the shop information is also written in the shopping list 254, it is sufficient if at least the desired product information and shop location information is written, in order to provide the memorandum information according to the preferred embodiment of the present invention. On the other hand, in addition to three pieces of the information shown in FIG. 5, other information may be written in the shopping list 254, such as a particular shop (shop A and the like), a price of the desired product item (eye lotion) sold in the shop (shop A and the like), a distance from the current location to the shop (shop A and the like), and an advertisement of the shop (shop A and the like).

Next, the memorandum list management unit 260 judges whether all product items in the listed-up desired product information (written in the shopping list 254) are read (S110).

If the memorandum list management unit 260 judges that all product items are not read, it reads another product item in the desired product information still not read from the shopping list 254 (S104) to execute the processes at Steps S106 to S110). In this manner, Steps S104 to S110 are repeated until the memorandum list management unit 260 reads all desired product items in the desired product information.

Furthermore, if the memorandum list management unit 260 judges that all product items are read, the shopping list 254 shown in FIG. 5 is completed.

(Notification of Memorandum Information to the User)

Figure 7:
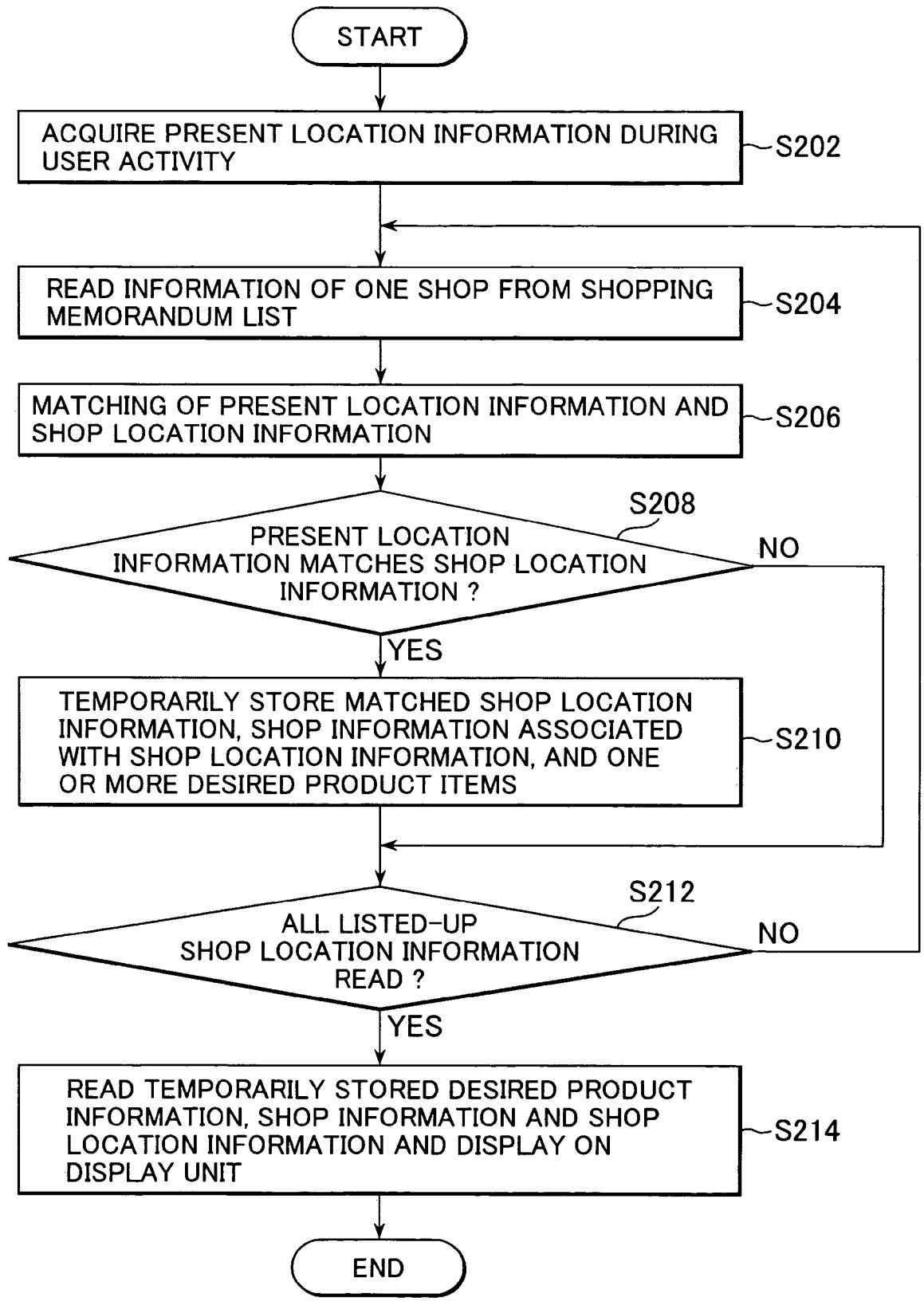
FIG. 7 is a flow chart illustrating the outline of a process of notifying a user of memorandum information after the process of forming the shopping list 254 in the memorandum information providing method according to the preferred embodiment of the present invention.
Figure 8:
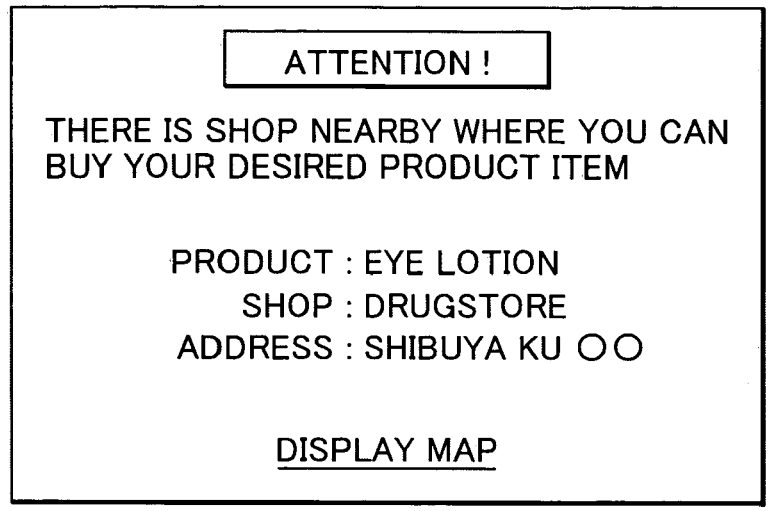
FIG. 8 is an illustrative diagram showing a display example of a display unit 242 when a notification unit 280 notifies memorandum information to a user.
Figure 9:
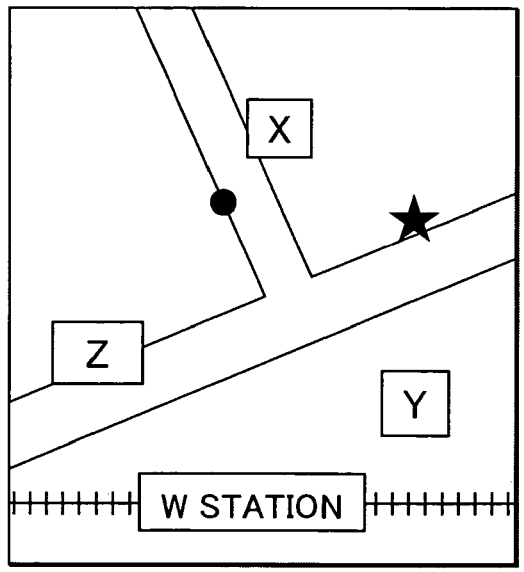
FIG. 9 is an illustrative diagram showing a display example of the display unit 242 when a map of a shop selling a desired product item is displayed.
Figure 10:
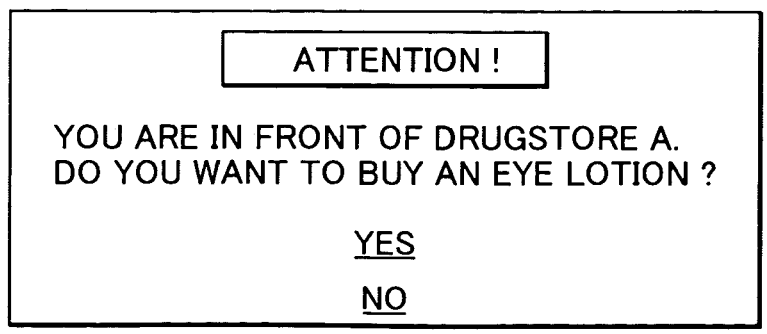
FIG. 10 is an illustrative diagram showing a display example of the display unit 242 when a confirmation message of whether the user already bought the desired product item.

Next, with reference to FIGS. 7 to 10, description will be made on the process of notifying the user of the memorandum information after the shopping list 254 is created according to a preferred embodiment of the present invention. FIG. 7 is a flow chart illustrating the outline process of notifying the user of the memorandum information after the shopping list 254 is created, in the memorandum information providing method of the preferred embodiment of the present invention. FIG. 8 is an illustrative diagram showing a display example on the display unit 242 when the notification unit 280 notifies the user of the memorandum information. FIG. 9 is an illustrative diagram showing a display example on the display unit 242 when a map of the shop selling the desired product item is displayed. FIG. 10 is an illustrative diagram showing a display example on the display unit 242 when a confirmation message for confirming whether the user bought the desired product item.

As a user goes out of the house by holding the portable terminal 200 which stores the shopping list 254 created by the above-described method in the storage unit 250, first the current location information acquisition unit 270 acquires the information on the current location of the portable terminal 200, i.e., the current location of the user (S202). In this case, as described earlier, the current location information is acquired by the positioning information system such as GPS built in the portable phone or an external apparatus, hot spots and PHS.

Next, the memorandum list management unit 260 reads the shop location information on one shop from the shop location information listed up in the shopping list 254 (S204) In this case, the shop location information on a plurality of shops may be read at a time.

Next, the notification unit 280 performs matching between the current location information acquired by the current location information acquisition unit 270 and the shop location information read by the memorandum list management unit 260 (S206). In the preferred embodiment of the present invention, "matching" and "matched" are not intended to mean the current location information is exactly coincident with the shop location information (e.g., the latitude/longitude is exactly coincident), but are intended to mean that both match within a certain allowable range. Namely, in this preferred embodiment of the present invention, "matched" is intended to mean the shop selling the desired product item is located at a predetermined distance (e.g., in a radius of 100 m) from the current location.

Conventional information retrieval mainly uses keyword matching in texts, sorting and filtering by time and date, and is impossible to retrieve information not written with texts, such as location information. According to the memorandum information providing method of the preferred embodiment of the present invention, the location information can be retrieved directly and a user is not required explicitly to change the location information into texts.

Next, the notification unit 280 judges whether the current location information matches the shop location information (S208). The matched shop location information, the shop information corresponding to the shop location information and the desired product information on one or more product items sold in this shop is temporarily stored in the storage unit 250 (S210). For this temporary storage, a cache memory and the like may be used to speed up the process speed of the processor 210. In this preferred embodiment of the present invention, although three pieces of the desired product information, shop information and shop location information are temporarily stored, it is sufficient if at least the desired product information and shop location information is temporarily stored, in order to provide the memorandum information according to the preferred embodiment of the present invention. On the other hand, in addition to the three pieces of the information, other information may be temporarily stored, such as a particular shop (shop A and the like), a price of the desired product item (eye lotion) sold in the shop (shop A and the like), a distance from the current location to the shop (shop A and the like), and an advertisement of the shop (shop A and the like).

Although the above-described matching between the current location information and shop location information is most preferably performed always without interception, it may be performed periodically at some interval (e.g., 5 minutes), or it may be performed in response to a matching request from a user.

Next, the memorandum list management unit 260 judges whether all product items in the listed-up desired product information (written in the shopping list 254) are read (S212).

If the memorandum list management unit 260 judges that all product items are not read, it reads another product in the desired product information still not read from the shopping list 254 (S204) to execute the processes at Steps S206 to S212. In this manner, Steps S204 to S212 are repeated until the memorandum list management unit 260 reads all desired product items in the desired product information.

Finally, if the memorandum list management unit 260 judges that all product items are read, the notification unit 280 reads the temporarily stored desired product information, shop information and shop location information and displays these information pieces on the display unit 242 to thereby notify the memorandum information to the user (S214). The shopping list 254 shown in FIG. 5 is completed. The memorandum information means information such as a desired product item (eye lotion and the like), the shop (drugstore and the like) selling the product item, and the location of the shop (address such as Shinjuku Ku ○○ or its map). All of these three pieces of the memorandum information may not be notified to the user. For example, only the desired product information or the desired product information and shop location information may be notified. A display example on the display unit 242 is shown in FIG. 8.

As shown in FIG. 8, displayed on the display unit 242 are, for example, a message indicating that a shop selling the desired product item is near the current location, a desired product item, the shop selling the product item and the address of the shop. In this case, it may be configured so that the user can link to map information. For example, as the user selects DISPLAY MAP, a map such as that shown in FIG. 9 may be displayed. In FIG. 9, a black dot mark "●" indicates the current location of the user (portable terminal 200) and a star mark "★" indicates the location of the shop selling the desired product item. X, Y and Z indicate other buildings and facilities.

When the map information is displayed, for example, the voice processing unit 244 may guide the user with voices so that the user can go to the shop selling the desired product item without going out of the right way.

As shown in FIG. 10, the notification unit 280 may display a message on the display unit 242, the message confirming whether the user bought actually the desired product item (eye lotion of the like). With this, the user can be prompted to surely buy the desired product item in the notified memorandum information. This confirmation message may be displayed, for example, when the matching executed by the notification unit 280 shows a perfect coincidence between two sets of the latitude/longitude, i.e., a zero distance between the current location and shop location, or when it shows a very near distance (e.g., shorter than 5 m) instead of the zero distance between the current location and shop location, or alternatively the message may be displayed in response to a user manual input instead of the automatic display.

As shown in FIG. 10, in addition to the purchase confirmation message, the notification unit 280 may be configured so that a user selects an answer to the message. In this case, if the user selects a purchase ("Yes" in FIG. 10), the memorandum list management unit 260 may delete the desired product information on already purchased product items and all information related to the desired product information, from the shopping list 254 (without a delete request from the user), whereas if the user selects no purchase ("No" in FIG. 10), the memorandum list management unit 260 does not delete the desired product information on the product item from the shopping list 254. The user can therefore be free from the situation that the memorandum information on the already purchased product item is notified again so that the same product item is bought erroneously twice. If the user cannot buy the product item because the user does not have a purse accidentally, when the notification unit 280 notifies the memorandum information, the user can notify the same memorandum information when the user comes near the shop next time. Since the notification unit 280 is provided with the function of displaying the purchase confirmation message and providing a user selection between purchase and no purchase, the notification unit 280 can notify the memorandum information while considering the user state.

Although information written in the shopping list 254 is automatically deleted as described above, unnecessary information may be deleted in response to a delete request from a user.

While preferred embodiments of the present invention have been described with reference to the attached drawings, it is to be understood that the present invention is not limited to the embodiments described above. It will be obvious to those skilled in the art that various changes, modifications, combinations, sub combinations and alterations may be made depending on design requirements and other factors insofar as they are within the scope of the appended claims or equivalents thereof.

For example, location information is not limited only to the location of a shop selling a desired product, but various types of information may be used such as the location of a restaurant servicing desired dishes, the location of a cinema house exhibiting a desired movie, the location of a theme park exhibiting attractions a user desires to experience, and other types of locations.

The present invention is applicable to portable terminals and, among others, to those portable terminals equipped with a device for acquiring present user location information such as GPS.

What is claimed is:

1. A memorandum system for operating a portable terminal as a memorandum, comprising:
    an ontological dictionary management server;
    a portable terminal; and
    a communication network for interconnecting the ontological dictionary management server and the portable terminal so as to enable bi-directional communications therebetween; wherein:
    the ontological dictionary management server includes:
        an ontological dictionary management section for managing an ontological dictionary organized by correlating a service item, site information related to a site providing the service item and a site position information related to the site information; and
a communications apparatus providing the ontological dictionary in response to a request from the portable terminal;
the portable terminal includes:
a communications apparatus for receiving the ontological dictionary from the ontological dictionary management server;
a storage apparatus containing the ontological dictionary and a user-specific memorandum list including listed-up service item information;
a memorandum list management section for reading out the service item information listed up in the memorandum list; collating the ontological dictionary, retrieving site position information related to the site information from site information providing the service item, and writing to the memorandum list by relating at least each service item information and the site position information related to the service item information;
a current position information acquisition section for acquiring current position information; and
a notification section for notifying memorandum information related to service item related to site position information matched by matching the current position information with the site position information of the memorandum list.

2. The memorandum system according to claim 1, wherein the ontological dictionary management section provides update information to the portable terminal when information registered in the ontological dictionary is updated.

3. A portable terminal comprising:
a storage apparatus containing a user-specific memorandum list including listed-up service item information, and an ontological dictionary organized by correlating a service item, site information related to a site providing the service item and a site position information related to the site information;
a memorandum list management section for reading out the service item information listed up in the memorandum list; collating the ontological dictionary, retrieving site position information related to the site information from site information providing the service item, and writing to the memorandum list by relating at least each service item information and the site position information related to the service item information;
a current position information acquisition section for acquiring current position information; and
a notification section for notifying memorandum information related to service item related to site position information matched by matching the current position information with the site position information of the memorandum list.

4. The portable terminal according to claim 3, wherein:
the service item information includes product information;
the memorandum list includes shopping memorandum list;
the site information includes shop information;
the site position information includes shop position information; and
the memorandum information includes at least information on a product to be purchased.

5. The portable terminal according to claim 4, wherein the ontological dictionary comprises:

a first database organized to relate the product information and the shop information; and
a second database organized to relate the shop information and the shop location information.

6. The portable terminal according to claim 3, further comprising:
a communications apparatus for receiving update information of the ontological dictionary from the ontological dictionary management server; and
an update section for updating the ontological dictionary within the storage apparatus, when receiving the update information.

7. A computer program for causing a portable terminal to function as:
a memorandum list management section for reading out service item information listed up in a user-specific memorandum list, collating an ontological dictionary, retrieving site position information related to site information from site information providing the service item, and writing to the memorandum list by relating at least each service item information and site position information related to the service item information;
a current position information acquisition section for acquiring current position information; and
a notification section for notifying memorandum information related to service item related to site position information matched by matching the current position information with the site position information of the memorandum list; wherein
the portable terminal comprises:
a storage apparatus containing the memorandum list including the listed-up service item information; and
the ontological dictionary organized by correlating a service item, site information related to a site providing the service item and site position information related to the site information.

8. The computer program according to claim 7, wherein:
the service item information includes product information;
the memorandum list includes shopping memorandum list;
the site information includes shop information;
the site position information includes shop position information; and
the memorandum information includes at least information on a product to be purchased.

9. The computer program according to claim 8, wherein the ontological dictionary comprises:
a first database organized to relate the product information and the shop information; and
a second database organized to relate the shop information and the shop location information.

10. The computer program according to claim 7, further performing the functions of:
a storage apparatus;
a communications apparatus for receiving update information of the ontological dictionary from the ontological dictionary management server; and
an update section for updating the ontological dictionary within the storage apparatus, when receiving the update information.

11. A computer-readable recording medium recording a program for causing a portable terminal to function as:
a memorandum list management section for reading out service item information listed up in a user-specific memorandum list, collating an ontological dictionary, retrieving site position information related to site information from site information providing the service item, and writing to the memorandum list by relating at least each service item information and the site position information related to the service item information;

a current position information acquisition section for acquiring current position information; and a notification section for notifying memorandum information related to service item related to site position information matched by matching the current position information with the site position information of the memorandum list; wherein the portable terminal comprises:

a storage apparatus containing the memorandum list including the listed-up service item information; and the ontological dictionary organized by correlating a service item, site information related to a site providing the service item and site position information related to the site information.

12. A memorandum information providing method of providing memorandum information to a portable terminal including a storage apparatus containing a user-specific memorandum list including listed-up service item information, and an ontological dictionary organized by correlating a service item, site information related to a site providing the service item and a site position information related to the site information, the memorandum information providing method comprising:

a memorandum list producing step of reading out the service item information listed up in the memorandum list; collating the ontological dictionary, retrieving site position information related to the site information from site information providing the service item, and writing to the memorandum list by relating at least each service item information and the site position information related to the service item information; a current position information acquisition step for acquiring current position information; and a notification step of notifying memorandum information related to service item related to site position information matched by matching the current position information with the site position information of the memorandum list.

13. The memorandum information providing method according to claim 12, wherein:

the service item information includes product information;

the memorandum list includes shopping memorandum list;

the site information includes shop information;

the site position information includes shop position information; and the memorandum information includes at least information on a product to be purchased.

14. The memorandum information providing method according to claim 13, wherein the ontological dictionary comprises:

a first database organized to relate the product information and the shop information; and a second database organized to relate the shop information and the shop location information.

15. The memorandum information providing method according to claim 12, further comprising:

a receiving step of receiving update information of the ontological dictionary from the ontological dictionary management server; and an update step of updating the ontological dictionary within the storage apparatus, when receiving the update information.

* * * * *